United States Patent [19]

Kalpakci et al.

[11] Patent Number: 4,979,564

[45] Date of Patent: Dec. 25, 1990

[54] METHOD OF ENHANCED OIL RECOVERY USING LOW TENSION VISCOUS WATERFLOOD

[75] Inventors: Bayram Kalpakci; Tevhide G. Arf, both of Sagamore Hills, Ohio

[73] Assignee: The Standard Oil Company, Cleveland, Ohio

[21] Appl. No.: 451,207

[22] Filed: Dec. 15, 1989

Related U.S. Application Data

[63] Continuation of Ser. No. 304,348, Jan. 31, 1989, abandoned, which is a continuation of Ser. No. 927,731, Nov. 5, 1986, abandoned.

[51] Int. Cl.⁵ ............................................. E21B 43/22
[52] U.S. Cl. .................................... 166/273; 166/274; 166/275; 252/8.554
[58] Field of Search ...................... 166/273, 274, 275; 252/8.554

[56] References Cited

U.S. PATENT DOCUMENTS

| | | |
|---|---|---|
| 3,373,810 | 3/1968 | Williams . |
| 3,811,507 | 5/1974 | Flournoy et al. ............ 252/8.554 X |
| 4,004,638 | 1/1977 | Burdyn ................. 166/273 |
| 4,077,471 | 3/1978 | Shupe et al. ................. 252/8.554 X |
| 4,110,229 | 8/1978 | Carlin et al. ...................... 252/8.554 |
| 4,166,038 | 8/1979 | Stournas ......................... 252/8.554 |
| 4,216,097 | 8/1980 | Stournas ......................... 252/8.554 |
| 4,271,907 | 6/1981 | Gale ................... 166/274 |
| 4,293,428 | 10/1981 | Gale et al. .................... 252/3.54 X |
| 4,360,061 | 11/1982 | Canter et al. ....................... 166/274 |
| 4,370,243 | 1/1983 | Chen et al. ........................ 252/8.554 |
| 4,421,168 | 12/1983 | Hurd ..................... 166/273 |
| 4,450,084 | 5/1984 | Abdo .............................. 252/8.554 |
| 4,457,372 | 7/1984 | Doster et al. ................ 252/8.554 X |
| 4,463,806 | 8/1984 | Hurd ............................. 252/8.554 X |
| 4,468,335 | 8/1984 | Chen et al. ........................ 252/8.554 |
| 4,479,894 | 10/1984 | Chen et al. ........................ 252/8.554 |
| 4,502,540 | 3/1985 | Byham ................................ 166/274 |
| 4,515,701 | 5/1985 | Hoskin .......................... 252/8.554 |
| 4,554,974 | 11/1985 | Kalpakci et al. ............ 252/8.554 X |
| 4,555,351 | 11/1985 | Morita et al. ................. 252/8.554 X |
| 4,667,405 | 5/1987 | Maddox ...................... 252/8.554 X |

FOREIGN PATENT DOCUMENTS

| | | |
|---|---|---|
| 1177636 | 11/1984 | Canada . |
| 1168849 | 6/1986 | Canada . |
| 0064384 | 11/1982 | European Pat. Off. . |

OTHER PUBLICATIONS

Kuuskraa, V. A., "The Status and Potential of Enhanced Oil Recovery", SPE/DOE 14951, prepared for presentation at the SPE/DOE Fifth Symposium on EOR, Apr. 20-23, 1986.
Friedman, F., "Surfactant and Polymer Losses During Flow Through Porous Media", SPE *Reservoir Eng.*, 1, 261-271 (1986).
Nagarajan, R., "Thermodynamics of Nonionic Polymer-Micelle Association", *Colloids and Surfaces,* 13, 1-17 (1985).
Prud'homme, R. K. et al., "Rheology Enhancement by Molecular Association Complexes", *Society of Petroleum Engineers Journal* (Aug., 1984), pp. 431-434.
H. H. Ferrell et al., "Progress Report: Big Muddy Field Low-Tension Flood Demonstration Project with Emphasis on Injectivity and Mobility", SPE/DOE 12682, Presented at Fourth Symposium on EOR at Tulsa, Okla., Apr. 15-18, 1984.
H. H. Ferrell et al., "Analysis of Low-Tension Pilot at Big Muddy Field, Wyo.", SPE/DOE 12683, Presented at Fourth Symposium on EOR at Tulsa, Okla., Apr. 15-18, 1984.
Cabane, B. et al., "Organization of Surfactant Micelles Absorbed on a Polymer Molecule in Water: A Neutron Scattering Study", *J. Physique,* 43, (1982) 1529-1542.
J. R. Bragg et al., "Loudon Surfactant Flood Pilot Test", SPE/DOE 10862, Presented at Third Symposium on EOR at Tulsa, Okla., Apr. 4-7, 1982.
Nagarajan, R. et al., "Viscometric Investigation of Complexes Between Polyethylene Oxide and Surfactant Micelles", Presented at 183rd ACS National Meeting, Las Vegas, Nev., Mar. 28-Apr. 2, 1982.
Ul, J. T. et al., "Rheology of Solution of Interacting Michelles and Polymer Chains", *Chem. Eng. Commun.,* 16, 45-52 (1982).
Kalpakci, B., "Flow Properties of Surfactant Solutions in Porous Media and Polymer-Surfactant Intereactions", Thesis Presented to Department of Chemical Engineering, Pennsylvania State University (Nov. 1981).
Kalpacki, B., et al., "Surfactant Binding to Polymer and Phase Separation in Aqueous Surfactant-Polymer Solutions", Paper Presented at the 90th National AICHE Meeting, Houston, Tex., Apr. 5-9, 1981.

(List continued on next page.)

*Primary Examiner*—George A. Suchfield
*Attorney, Agent, or Firm*—Raymond F. Keller; David J. Untener; Larry W. Evans

[57] ABSTRACT

A method is disclosed for recovering oil from a subterranean formation comprising injecting an aqueous composition into said formation and displacing said oil toward one or more production wells, said aqueous composition comprising:

(A) from about 0.05% to about 1.2% by weight of at least one compound represented by the formula

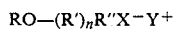

$$RO-(R')_nR''X^-Y^+$$

wherein: R is a hydrocarbonyl group of from about 8 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20; and (B) from about 0.02% to about 0.3% by weight of at least one polymeric thickener.

17 Claims, No Drawings

OTHER PUBLICATIONS

S. P. Gupta, "Dispersive Mixing Effects in the Sloss Field Micellar System", SPE/DOE 9782, Presented at Second Symposium on EOR at Tulsa, Okla., Apr. 5-8, 1981.

Desai, N. N., et al., "Physico-Chemical Aspects of Phase Separation in Mixed Surfactant-Polymer Systems", Paper Presented at New York Meeting, American Chemical Society, vol. 22, No. 2, pp. 39-40 (1981).

D. L. Taggart et al., "Sloss Micellar/Polymer Flood Post Test Evaluation Well", SPE/DOE 9781, Presented at Second Symposium on EOR at Tulsa, Okla., Apr. 5-8, 1981.

Qutubuddin, S. et al., "Proposed Mechanism of Polymer-Surfactant Interactions in Enhanced Oil Recovery", *Polymer Preprints*, 22 (2), pp. 41-46 (1981).

Nagarajan, R., "On the Nature of Interactions Between Polymers and Surfactants in Dilute Aqueous Solutions", Presented at New York Meeting of ACS, vol. 22, No. 2, Aug., 1981, pp. 33-38.

Nagarajan, R. et al., "Surfactant-Polymer Interactions in Tertiary Oil Recovery", Paper Presented at the International Symposium on the Solution Behavior of Surfactants, Potsdam, New York, Jun., 1980.

S. P. Gupta, "Composition Effects on Displacement Mechanisms of the Micellar Fluid Injected in the Sloss Field Test", SPE 8827, Presented at First Symposium on EOR at Tulsa, Okla., Apr. 20-23, 1980.

J. L. Wanosik et al., "Sloss Micellar Pilot: Project Design and Performance", SPE 7092, Presented at Tulsa, Olka., Apr. 16-19, 1978.

P. B. Basan et al., "Important Geological Fators Affecting the Sloss Field Micellar Pilot Project", SP 7047, Presented at Tulsa, Okla., Apr. 16-19, 1978.

Tsaur, K., "A Study of Polymer/Surfactant Interactions for Micellar/Polymer Flooding Applications", M. S. Thesis, The University of Texas at Austin, 1978.

Cabane, B., "Structure of Some Polymer-Detergent Aggregates in Water", *J. of Physical Chemistry*, 81, 1639-1645 (1977).

Shirahama, K. et al., "The Interaction Between Sodium Alkylsulfates and Polyethlene Oxide in 0.1M NaCl Solutions", *J. of Colloid and Interface Sci.*, 54, 450-452 (1976).

Smith, M. L. et al., "Fluorine Magnetic Resonance and Equilibrium Dialysis Study of the Binding of Sodium 12,12,12-Trifluorododecylsulfate by Polyethyl Glycol", *J. of Colloid and Interfact Sci.*, 52, 507-515 (1975).

Fishman, M. L. et al., "Interactions of Aqueous (N-vinylpyrrolidone) with Sodium Dodecyl Sulfate. II. Correlation of Electric Conductivity and Viscosity Measurements with Equilibrium Dialysis Measurements", *The J. of Physical Chemistry*, 79, 2740-2744 (1975).

Tadros, T. F., "The Interaction of Cetyltrimethylammonium Bromide and Sodium Dodecylbezene Sulfonate with Polyvinyl Alcohol. Adsorption of the Polymer-Surfactant Complexes on Silica", *J. of Colloid and Interface Sci.*, 46, 528-548 (1974).

Shirahama, K., "The Binding Equilibrium of Sodium Dodecyl Sulfate to Polyethylene Oxide in 0.1M Sodium Chloride Solution at 30 C.", *Colloid and Polymer Sci.*, 252, 978-981 (1974).

Schwuger, M. J., "Mechanism of Interaction Between Ionic Surfactants and Polyglycol Ethers in Water", *J. of Colloid and Interface Sci.*, 43, 491-498 (1973).

Hill, H. J. et al., "Aqueous Surfactant Systems for Oil Recovery", *J. Pet. Tech.*, pp. 186-194 (Feb. 1973).

French. M. S. et al., "Field Test of an Aqueous Surfactant System for Oil Recovery, Benton Field, Ill.", *J. Pet. Tech.*, pp. 195-204 (Feb. 1973).

Saito, S. et al., "Interactions of Anionic Surfactants with Nonionic Polymers. Comparison of Guanidinium, Tetraalkylammonium, and Alkali Metal Ions as Counterions", *J. of Colloid and Interface Sci.*, 37, 154-164 (1971).

Arai, H. et al., "The Interaction Between Polymer and Surfactant: The Composition of the Complex Between Polyvinylpyrrolidone and Sodium Alkyl Sulfate as Revealed by Surface Tension, Dialysis, and Solubilization", *J. of Colloid and Interface Sci.*, 37, 223-227 (1971).

Saito, S. et al., "Counterion Effect of Tetraalkylammonium and Long-Chain Alkylammonium Salts in the Interaction with Nonionic Polymers", *J. of Colloid and Interface Sci.*, vol. 35, No. 2, pp. 346-353, (Feb. 1971).

Horin, S. et al., "The Effect of Added Salt on the Interaction Between Polymer and Detergent in Aqueous Solution", *J. of Colloid and Interface Sci.*, 32, 547-550 (1970).

Lewis, K. E. et al., "The Interaction of Sodium Dodecyl Sulfate with Methyl Cellulose and Polyvinyl Alcohol", *J. of Colloid and Interface Sci.*, 32, 539-546 (1970).

Arai, H. et al., "Interaction Between Polymer and Detergent in Aqueous Solution", *J. of Colloid and Interface Sci.*, 30, 372-377 (1969).

Saito, S., "Solubilization Properties of Polymer-Surfactant Complexes", *J. of Colloid and Interface Sci.*, 24, 227-234 (1967).

Jones, M. N., "The Interaction of Sodium Dodecyl Sulfate with Polyethylene Oxide", *J. of Colloid and Interface Sci.*, 23, 36-42 (1967).

Saito, S., "Binding of Surfactants by Polymers", *J. Colloid Interface Sci.*, 15, 283-286 (1960).

METHOD OF ENHANCED OIL RECOVERY USING LOW TENSION VISCOUS WATERFLOOD

This is a continuation of co-pending application Ser. No. 07/304,348 filed on Jan. 31, 1989, now abandoned, which was a continuation of 927,731, filed Nov. 5, 1986, now abandoned.

TECHNICAL FIELD

This invention relates to the recovery of oil from subterranean oil reservoirs and, more particularly, to improved waterflooding operations involving the use of waterfloods containing relatively low concentrations of at least one surfactant in combination with at least one polymeric thickener.

BACKGROUND OF THE INVENTION

In the recovery of oil from oil-bearing reservoirs, it is usually possible to recover only minor portions of the original oil in place by the so-called primary recovery methods which utilize only the natural forces present in the reservoir. A variety of supplemental recovery techniques have been employed in order to increase the recovery of oil from subterranean reservoirs. The most widely used supplemental recovery technique is waterflooding which involves the injection of water into the reservoir. As the water moves through the reservoir, it acts to displace oil therein to a production systm composed of one or more wells through which the oil is recovered.

It has long been recognized that factors such as the interfacial tension between the injected water and the reservoir oil, the relative mobilities of the reservoir oil and injected-water, and the wettability characteristics of the rock surfaces within the reservoir are factors which influence the amount of oil recovered by waterflooding. It has been proposed to add surfactants to the flood water in order to lower the oilwater interfacial tension and/or alter the wettability characteristics of the reservoir rock. Processes which involve the injection of aqueous surfactant solutions are commonly referred to as surfactant waterflooding or as low tension waterflooding, the latter term having reference to the mechanism involving the reduction of the oil-water interfacial tension. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

Many waterflooding processes have employed anionic surfactants. One problem encountered in waterflooding with certain of the anionic surfactants such as the petroleum sulfonates is the lack of stability of these surfactants in so-called "hard water" environments. These surfactants tend to precipitate from solution in the presence of relatively low concentrations of divalent metal ions such as calcium and magnesium ions. For example, divalent metal ion concentrations of about 50-100 ppm and above usually tend to cause precipitation of the petroleum sulfonates.

Nonionic surfactants, such as polyethoxylated alkyl phenols, polyethoxylated aliphatic alcohols, carboxylic esters, carboxylic amides, and polyoxyethylene fatty acid amides, have a somewhat higher tolerance of polyvalent ions such as calcium or magnesium than do the more commonly utilized anionic surfactants. While it is technically feasible to employ a nonionic surfactant solution to decrease the interfacial tension between the injected aqueous displacing medium and petroleum contained in some limestone formations, such use is generally not economically feasible for several reasons. Nonionic surfactants are not as effective on a per mole basis as are the more commonly used anionic surfactants and, additionally, the nonionic surfactants generally have a higher cost per unit weight than do the anionic surfactants. Nonionic surfactants usually exhibit a reverse solubility relationship with temperature and become insoluble at temperatures of above their cloud points making them ineffective in many oil formations. Nonionic surfactants that remain soluble at elevated temperatures are generally not effective in reducing interfacial tension. Moreover, nonionic surfactants hydrolyze at temperatures above about 75° C.

The use of certain combinations of anionic and nonionic surfactant to combat hard water formations has also been suggested. For example, U.S. Pat. No. 3,811,505 discloses the use of alkyl or alkylaryl sulfonates or phosphates and polyethoxylated alkyl phenols. U.S. Pat. No. 3,811,504 discloses the use of three component mixture including an alkyl or alkylaryl sulfonate, an alkyl polyethoxy sulfate and a polyethoxylated alkyl phenol. U.S. Pat. No. 3,811,507 discloses the use of a water-soluble salt of a linear alkyl or alkylaryl sulfonate and a polyethoxylated alkyl sulfate.

Cationic surfactants such as quaternary ammonium salts, and derivatives of fatty amines and polyamines, have also been used. However, these compounds have the disadvantage of substantivity or attraction, especially towards silicate rock, and they lose their activity by adsorption.

The use of certain amphoteric surfactants which function as cationics in acid media and become anionic when incorporated in alkaline systems has been suggested. For example, U.S. Pat. No. 3,939,911 discloses a surfactant waterflooding process employing a three-component surfactant system. This surfactant system includes an alkyl or alkylaryl sulfonate such as an ammonium dodecyl benzene sulfonate, a phosphate ester sulfonate, and a sulfonate betaine such as a $C_{12}$–$C_{24}$ alkylamido $C_1$–$C_5$ alkane dimethylammonium propane sulfonate.

The use of hydrocarbyl-substituted polyoxyalkylene sulfonates is disclosed, for example, in U.S. Pat. Nos. 3,916,994; 4,181,178; 4,231,427; 4,269,271; 4,270,607; 4,296,812; 4,307,782; 4,316,809; 4,485,873; and 4,478,281. These patents are incorporated herein by reference.

The use of thickening agents to increase the viscosity of injected water, normally to a value of at least equal to that of the reservoir oil, in order to arrive at a favorable mobility ratio between the oil and water and increase the macroscopic displacement efficiency of waterflood is known. Examples of such thickeners or mobility control agents are polysaccharides such as xanthan gum, which are available from Kelco Company under the tradename "Kelzan", and partially hydrolyzed polyacrylamides available from the Dow Chemical Company under the tradename "Pusher".

U.S. Pat. No. 4,554,974 discloses an enhanced oil recovery method employing betaine amphoteric surfactants in combination with high molecular weight homopolysaccharide gum thickeners in a waterflood. The waterflood can be followed by a thickened buffer slug and then an aqueous flooding medium to displace the oil toward a production well.

A paper by W. R. Foster entitled "A Low-Tension Waterflooding Process", Journal of Petroleum Technology, Vol. 25, February 1973, pp. 205–210, describes a technique involving the injection of an aqueous solution of petroleum sulfonates within designated equivalent weight ranges and under controlled conditions of salinity. The petroleum sulfonate slug is followed by a thickened water slug which contains a a water-soluble biopolymer. This thickened water slug is then followed by a field brine driving fluid which is injected as necessary to carry the process to conclusion.

A number of tests employing polymeric thickeners in surfactant waterflooding have been reported in the literature. M. S. French et al and H. J. Hill et al report the use of 1.3% by weight petroleum sulfonate and 0.5% by weight sodium tripolyphosphate, and a partially hydrolyzed polyacrylamide polymer in a 9250 ppm TDS brine solution. M. S. French et al, "Field Test of an Aqueous Surfactant System for Oil Recovery, Benton Field, Illinois", J. Pet. Tech., February, 1973, pp. 195–204; and H. J. Hill et al, "Aqueous Surfactant Systems for Oil Recovery", J. Pet. Tech., February, 1973, pp. 186–194. H. H. Ferrell et al report pilot studies using 2.5% of a mixture of synthetic and petroleum sulfonates, 3% isobutyl alcohol and a biopolymer in a 1.0% NaCl brine solution. H. H. Ferrell et al, "Analysis of Low-Tension Pilot at Big Muddy Field, Wyoming.", SPE/DOE 12683. H. H. Ferrell et al report field tests using 3.0% alkyl benzene sulfonate, 5% isobutyl alcohol and partially hydrolyzed polyacrylamide in about 6000 ppm TDS brine solution. H. H. Ferrell et al, "Progress Report: Big Muddy Field Low-Tension Flood Demonstration Project with Emphasis on Injectivity and Mobility", SPE/DOE 12682. J. R. Bragg et al report pilot studies using 2.3% of a hardness tolerant surfactant and a biopolymer in formation brine. J. R. Bragg et al, "Loudon Surfactant Flood Pilot Test", SPE/DOE 10862. D. L. Taggart et al report the use of 3.86% petroleum sulfonate, 1.25% isobutyl alcohol and partially hydrolyzed polyacrylamide in a 1.2% NaCl brine solution. D. L. Taggart et al, "Sloss Micellar/-Polymer Flood Post Test Evaluation Well", SPE/DOE 9781. See also, S. P. Gupta, "Composition Effects on Displacement Mechanisms of the Micellar Fluid Injected in the Sloss Field Test", SPE 8827; S. P. Gupta, "Dispersive Mixing Effects on the Sloss Field Micellar System", SPE/DOE 9782; J. L. Wanosik et al, "Sloss Micellar Pilot: Project Design and Performance", SPE 7092; P. B. Basan et al, "Important Geological Factors Affecting the Sloss Field Micellar Pilot Project", SP 7047.

While many surfactant waterflooding methods have been proposed, there is a substantial, unfulfilled need for a surfactant waterflooding method that is useful in recovering oil from subterranean formations wherein the surfactant(s) employed are utilized at sufficiently low concentration levels to render the method economically feasible. It would be desirable if the chemicals employed in this method were suitable for use in environments characterized by high salinities and high concentrations of divalent metal ions such as are found in sea water.

SUMMARY OF THE INVENTION

The present invention provides for a method for recovering oil from a subterranean formation comprising injecting an aqueous composition into said formation and displacing said oil towards one or more production wells, said aqueous composition comprising:

(A) from about 0.05% to about 1.2% by weight of at least one compound represented by the formula

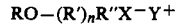

wherein: R is a hydrocarbyl group of from about 8 to about 24 carbon atoms; R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20; and (B) from about 0.02% to about 0.3% by weight of at least one polymeric thickener.

DESCRIPTION OF THE PREFERRED EMBODIMENTS

The term "hydrocarbyl", when used throughout this specification and in the appended claims, denotes hydrocarbon groups and groups having a predominantly hydrocarbon character within the context of the invention. Such hydrocarbyl groups include the following:

1. Hydrocarbon groups, that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic materials, and the like.

2. Substituted hydrocarbon groups, that is, groups containing non-hydrocarbon substituents which, in the context of this invention, do not alter the predominantly hydrocarbon character of the group. Those skilled in the art will be aware of suitable substituents; examples are:

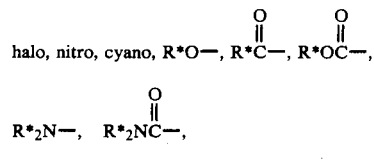

(R* being hydrogen or a hydrocarbon group).

3. Hetero groups, that is, groups which, while predominantly hydrocarbon in character within the context of this invention, contain atoms other than carbon present in a chain or ring otherwise composed of carbon atoms. Suitable hetero atoms will be apparent to those skilled in the art and include, for example, oxygen and nitrogen.

The surfactants that are used in accordance with the method of the present invention are represented by the formula

wherein R is a hydrocarbyl group of about 8 to about 24 carbon atoms, preferably about 8 to about 20 carbon atoms, more preferably about 12 to about 18 carbon atoms. R is preferably an alkyl, alkenyl, alkaryl or aryl group, more preferably an alkyl or an alkenyl group. R can be straight chained or branch chained. R' is ethoxy, propoxy or a mixture thereof. R" is a divalent hydrocarbyl group of 1 to about 20 carbon atoms, more preferably from 1 to about 10 carbon atoms, more preferably from about 2 to about 4 carbon atoms, more preferably about 2 to about 3 carbon atoms. R"can be an alkyl, alkenyl, alkaryl or aryl group. R" is preferably an alkyl group. X is a sulfate, sulfonate or carboxylate group. Y is a cation, preferably an alkali metal (preferably Na+ or K+), an alkaline earth metal (preferably Ca++ or Mg++) a nitrogen-containing group represented by the formula

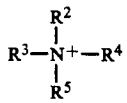

wherein $R_2$, $R^3$, $R^4$ and $R^5$ are independently hydrogen or methyl, preferably $R^2$, $R^3$, $R^4$ and $R^5$ are each hydrogen. n is a number in the range of 1 to about 20, more preferably in the range of about 1 to about 10, more preferably in the range of about 1 to about 6. It should be understood that these surfactants are typically not pure substances in the strict sense, but rather are mixtures of components distributed such that n is the resulting average value.

These surfactants can be prepared in a number of ways using known procedures. Suitable precursors include $C_{10-24}$ linear or branched-chain alcohols. Preferably the linear or branched-chained alcohol contains from about 10 to about 20 carbon atoms, more preferably about 12 to about 18 carbon atoms. If R' is ethoxy, the alcohol is reacted with ethylene oxide to yield a hydrocarbyl oxyethylene ether. The average number of ethylene oxide units can vary from 1 to about 20, more preferably from 1 to about 10, more preferably from 1 to about 6. If R' is propoxy, the alcohol is reacted with propylene oxide to yield a hydrocarbyloxypropylene ether. The average number of propylene oxide units can also vary from 1 to about 20, more preferably from 1 to about 10, more preferably from 1 to about 6.

If R' is a mixture of ethoxy and propoxy groups, the alcohol is reacted initially with either ethylene oxide or propylene oxide, and then the resulting intermediate product is reacted with the other. The sequence of reaction of the alcohol with ethylene oxide or propylene oxide is dependent upon the desired structure of the surfactant. For example, if it is desired to have ethylene oxide attached to the RO group, the alcohol is initially reacted with ethylene oxide and then the resulting intermediate product is reacted with propylene oxide. On the other hand, if it is desired to have propylene oxide attached to the RO group, the alcohol is initially reacted with propylene oxide and then the resulting intermediate product is reacted with ethylene oxide. Any combination of ethoxy and propoxy groups in the surfactants of the invention is useful. Preferably the total number of ethoxy and propoxy groups ranges from 1 to about 20, more preferably from 1 to about 10, more preferably from 2 to about 6.

Methods of alkoxylation are well known to those skilled in the art. The alkoxylation reaction can be achieved using a strong base or Lewis acid catalyst such as NaOH, KOH, $BF_3$ or $SnCl_2$. Examples of other suitable bases include sodium phenolate and alkali metal alkoxides such as sodium methoxide or propoxide. Other suitable acids include $BF_3$-etherate, p-toluene sulfonic acid, fluorosulfonic acid, aluminum butyrate and perchloric acid.

This invention applies to both sulfated and sulfonated surfactants. When the surfactant is a sulfate, X is $OSO_3^-$; when the surfactant is a sulfonfate, ate, X is $SO_3^-$. Sulfates and sulfonates are made somewhat differently but they behave similarly in this invention. Alkoxylated surfactants that are sulfates can be prepared in a number of ways well known to those skilled in the art. The techniques of sulfonation which may be used to prepare such surfactants are discussed in the U.S. Pat. No. 4,203,428, which is incorporated herein by reference. Alkoxylated surfactants that are sulfonates can also be prepared in a number of ways. For example, they may be prepared in the same way as alkoxylated sulfates with sulfonation substituted for the sulfation step, as described in U.S. Pat. No. 4,293,428, which is incorporated herein by reference. The sulfated or sulfonated material can then be neutralized using, for example, an alkali metal, alkaline earth metal or ammonium to form the sulfated or sulfonated surfactant.

A carboxylate group may be incorporated into the alkoxylated material by any number of well-known methods. For example, the alkoxylated material may be reacted with a halogen carboxylic acid to result in a carboxylic acid. Alternatively, the alcoholic end group —$CH_2OH$ can simply be oxidized under well known conditions to yield a carboxylic acid. The resulting product is then neutralized using, for example, an alkali metal alkaline earth metal or ammonium to form the carboxylate surfactant.

The surfactants (A) of the invention are preferably present in the aqueous compositions used in accordance with the inventive method at a level in the range of about 0.05% to about 1.2% by weight, more preferably from about 0.1% to about 1% by weight, more preferably from about 0.1% to about 0.7% by weight, and still more preferably from about 0.15% to about 0.5% by weight of said aqueous composition.

These surfactants have a high tolerance to high levels of aqueous phase salinity (e.g., total dissolved salts (TDS) concentrations or values of up to about 200,000 ppm) as well as high levels of divalent metal ions such as calcium, magnesium, and the like (e.g., up to about 20,000 ppm). Accordingly, the water employed in the inventive method can be a high salinity brine such as sea water.

In an alternate embodiment of the invention, the surfactant (A) can be used in combination with a co-surfactant represented by the formula

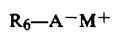

wherein $R^6$ is a hydrocarbyl group of preferably from about 10 to about 28 carbon atoms, more preferably from about 16 to about 22 carbon atoms, and M is a cation. $R^6$ is preferably an alkyl or an alkenyl group, and internal olefins are particularly preferred. A is a sulfate, sulfonate or carboxylate group. M is preferably an alkali metal (e. g., Na+, K+) alkaline earth metal (e.g., Ca++, Mg++), or an ammonium ion. An example of a commercially available material that is useful in the inventive method is Enordet IOS 1720 (a product of Shell identified as a sulfonated $C_{17-20}$ internal olefin, sodium salt). The concentration of these co-surfactants, when used, is preferably in the range of up to 1% by weight, more preferably up to about 0.5% by weight, still more preferably up to about 0.3% by weight of the aqueous compositions used in the inventive method.

The polymeric thickeners (B) can be any thickening agent that is stable under the anticipated operating conditions. These thickeners are preferably employed in the aqueous compositions of the invention at a level in the range of from about 0.02% to about 0.3% by weight, more preferably from about 0.05% to about 0.15% by weight. A preferred class of polymers suitable for use in carrying out the present invention include polysaccharides such as those available commercially which are produced by fermentation of carbohydrates by bacteria of the genus Xanthomonas. Examples of such polysaccharides are those produced by action of *Xanthomonas Campestris, Xanthomonas Begonia, Xanthomonas Phaseoli, Xanthomonas Hederae, Xanthomonas Incanae, Xanthomonas Carotae,* and *Xanthomonas Translucens.* Preferred species are xanthan gums which are commercially available from Pfizer under the tradenames "Flocon 4800", "Flocon 4800 M" and "Flocon 4800 MT". Another preferred species is a polysaccharide which is available under the tradenames "Kelzan" and "Biozan" from Kelco Company. Production of useful polysaccharides is described in Smiley, K. L. "Microbia Polysaccharide-A Review", Food Technology 29,9:112–116 (1966) and in Moraine, R. A., Rogovin, S. P., and Smiley, K. L. "Kinetics of Polysaccharide B-1459 Synthesis", J. Fermentation Technology, 44, pp. 311–132 (1966), which are incorporated herein by reference.

A class of thickeners that is particularly useful includes the homopolysaccharide gum thickeners represented by the formula:

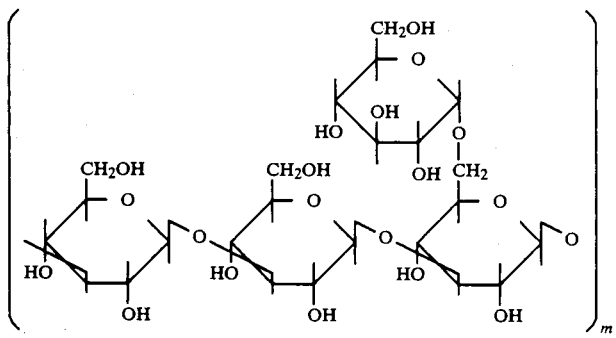

wherein m is a number that is high enough to provide the desired molecular weight. These thickeners are typically nonionic and have a molecular weight that is greater than about one million, preferably in the range of about 1 to about 3.5 million. The polymer structure is preferably a linear chain of anhydroglucose units linked beta (1–3). In a particularly advantageous embodiment about 30% to about 35% of the linear chain units bear single appended anhydroglucose units linked beta (1–6). This thickener is preferably cell-free and produced by selected fungus strains of the genus Schlerotium in a pure culture fermentation. An example of a commercially available thickener of this type is Actigum CS-11, a product of Jetco Chemicals identified as scleroglucan.

Another preferred class of polymeric thickeners that are useful with the inventive method includes the commercially available, water-soluble high molecular weight, unhydrolyzed or partially hydrolyzed polyacrylamides having molecular weights in the range of above about $0.2 \times 10^6$, preferably from about $0.5 \times 10^6$ to about $40 \times 10^6$, more preferably from about $3 \times 10^6$ to about $10 \times 10^6$. Copolymers of acrylamide and acrylic acid within the same molecular weight range, may also be used. If the polymer employed is a partially hydrolyzed polyacrylamide, up to about 70% and preferably from about 12% to about 45% of the carboxylamide groups are hydrolyzed to carboxyl groups. A number of partially hydrolyzed polyacrylamides and/or copolymers of acrylamide and acrylic acid are available commercially and commonly employed in enhanced oil recovery. These include, for example, materials marketed by the Dow Chemical Company under the trade name "Pusher" and by American Cyanamid under the tradename "Cyanatrol".

Naturally occurring polymers may also be employed as the polymeric thickeners in the inventive method. Included in this class of effective materials are Guar gum, Locus Bean Gum, natural starches and derivatives thereof, cellulose and its derivatives including hydroxy ethyl cellulose.

The inventive method may be carried out utilizing injection and production systems as defined by any suitable arrangement of wells. One well arrangement commonly used in waterflooding operations and suitable for use in carrying out the method of the present invention is an integrated five-spot pattern of the type illustrated in U.S. Pat. No. 3,927,716 which is incorporated herein by reference. Other well arrangements may be used in carrying out the present invention, examples of some of which are also disclosed in the foregoing '716 patent.

The term "pore volume" is used herein to mean that volume of the portion of the formation underlying the well pattern employed, as described in greater detail in the '716 patent.

The aqueous composition containing components (A) and (B) that is injected in accordance with the inventive method can be referred to as a surfactant slug. In a typical operation, the surfactant slug is injected into the formation through one or more injection wells using standard techniques known in the art, then, depending on the design of the process, a buffer slug may be injected, and finally an aqueous flooding medium is injected after the surfactant slug (or if a buffer slug is used after the buffer slug) to drive the oil toward one or more production wells. The buffer slug contains an effective amount of a thickener to increase the viscosity of the buffer slug to the same level or a level above that of the surfactant slug, and thereby provide stable propogation of the mobilized oil toward the production wells. The thickener employed in the buffer slug can be the same or different than component (B), but is preferably the same.

The size of the surfactant slug typically ranges from about 0.2 to about 3 pore volumes. The size of the buffer slug is preferably in the range of up to about 3 pore volumes.

The drive fluid or aqueous flooding medium is injected into the reservoir in sequential order after the surfactant slug, or if a buffer slug is used after the buffer slug. This flooding medium is preferably water and can be any source of water, such as sea water, that is readily available.

An advantage of the method of the present invention is that it can be practiced in subterranean formations having temperatures ranging from about 15° C. to about 120° C. and above, high pressures (e.g., up to about 4000 psi), and the flood water can have a high salinity (e.g., TDS values as high as about 200,000 ppm such as when the floodwater is sea water), and high concentrations of divalent metal ions (e.g., up to 20,000 ppm). These conditions are typically encountered under various circumstances at Prudhoe Bay, the North Sea, the Persian Gulf, the Gulf of Mexico, as well as other major oil fields.

The following examples are provided for the purpose of further illustrating the method of the present invention. Unless otherwise indicated, in the following examples as well as throughout the specification and in the claims, all parts and percentages are by weight, and all temperatures are in degrees centigrade.

In the following Examples 1-7, oil displacement tests were conducted at a temperature of 93.3° C. using a stock tank oil and Berea sandstone cores. The sandstone cores had dimensions of 1.5"×24", average porosities of 22% and average permeabilities of 420 md. Each core was first degassed under vacuum and then saturated with a brine having a TDS concentration of 24,000 ppm, including 250 to 300 ppm multivalent cations. The cores were thereafter flooded with reservoir oil until no further brine could be produced. The cores were then flooded with seawater until no further oil could be produced. The average residual oil level in each core was about 37% of the core pore volume. The aqueous compositions identified in the examples were then injected into the cores until approximately 2 to 3 pore volumes of such aqueous compositions had been injected. Sea water was used in formulating these aqueous compositions. The sandstone cores were then flooded with 2 to 5 pore volumes of seawater.

The seawater that was used in the following examples had about 30,000 ppm TDS level and contained the following major cations:

| Cation | ppm |
|---|---|
| Na+ | 9200–9300 |
| Mg++ | 1080–1100 |
| Ca++ | 330–340 |
| K+ | 330–350 |
| Sr++ | 5–10 |

The interfacial tension (IFT) measurements reported in the following examples were determined using the following procedure. The aqueous phase and the oil phase were first pre-equilibrated by mixing one part by volume of the oil phase with one part by volume of the aqueous phase. The aqueous phase consisted of the aqueous compositions identified in the following examples. The oil phase and aqueous phase were brought to thermal equilibrium at 93.3° C. The mixture was then shaken by hand for about 30 seconds and allowed to equilibrate until there was no change in the volume of each phase. IFT values for these systems were determined at 80° C. using a spinning drop interfacial tensiometer. These IFT values were determined in the following way: the interfacial tension of a system was measured as a function of time, usually for 2 hours. If the values for the last 20 minutes agreed to within 1-2%, the 2-hour measurement was reported; if not, the measurements were continued until the 1-2% agreement for a 20-minute period was obtained.

EXAMPLES 1-6

Examples 1-6, which are reported in Table I are illustrative of the invention. Examples 1A-6A, which are also reported in Table I, are provided for purposes of comparison. Examples 1-6 are identical to Example 1A-6A, respectively, with the exception that polymeric thickeners are employed in Examples 1-6 in accordance with the inventive method while such thickeners are not employed in Examples 1A-6A. In Table I, the numerical values for surfactants and polymeric thickeners are in percent by weight. Sea water having the above-indicated characteristics was used for each example.

TABLE I

| Surfactants | 1 | 1A | 2 | 2A | 3 | 3A |
|---|---|---|---|---|---|---|
| Hoechst Dodiflood B-897[a] | 0.05 | 0.05 | — | — | — | — |
| Linear Alkyl Ethoxypropane sulfonate[b] | — | — | 0.075 | 0.075 | — | — |
| EDTA[c] | — | — | 0.004 | 0.004 | 0.004 | 0.004 |
| Shell Enordet APES 1215[d] | — | — | — | — | 0.2 | 0.2 |
| Petrolig ERA-16[e] | — | — | — | — | — | — |
| Linear Alkylpropoxy ethoxypropane sulfonate[f] | — | — | — | — | — | — |
| Branched alkylpropoxyethoxypropane sulfonate[g] | — | — | — | — | — | — |
| Linear alkyl propoxypropane sulfonate[h] | — | — | — | — | — | — |
| Shell Enordet IOS 1720[i] | 0.25 | 0.25 | 0.25 | 0.25 | 0.15 | 0.15 |
| Polymeric Thickeners | | | | | | |
| Flocon 4800M[j] | 0.15 | — | 0.15 | — | 0.15 | — |
| Actigum CS-11[k] | — | — | — | — | — | — |
| Test Results | | | | | | |
| Oil Displacement % of ROIP[l] | 66 | — | 66 | — | 76 | — |
| IFT, (Dynes/cm) × 10$^{-3}$ | 9.0 | 22 | 60 | 100 | 1.2 | 9.5 |
| Hoechst Dodiflood B-897[a] | 0.05 | 0.05 | — | — | — | — |
| Linear Alkyl Ethoxypropane sulfonate[b] | — | — | — | — | — | — |
| EDTA[c] | — | — | — | — | — | — |
| Shell Enordet APES 1215[d] | — | — | — | — | — | — |
| Petrolig ERA-16[e] | 0.5 | 0.5 | — | — | — | — |
| Linear Alkylpropoxy ethoxypropane sulfonate[f] | — | — | 0.225 | 0.225 | — | — |
| Branched alkylpropoxyethoxypropane sulfonate[g] | — | — | 0.125 | 0.125 | — | — |
| Linear alkyl propoxypropane sulfonate[h] | — | — | — | — | 0.35 | 0.35 |
| Shell Enordet IOS 1720[i] | 0.25 | 0.25 | — | — | — | — |
| Polymeric Thickeners | | | | | | |
| Flocon 4800M[j] | — | — | — | — | — | — |
| Actigum CS-11[k] | 0.15 | — | 0.15 | — | 0.15 | — |

TABLE I-continued

| Surfactants | 1 | 1A | 2 | 2A | 3 | 3A |
|---|---|---|---|---|---|---|
| Test Results | | | | | | |
| Oil Displacement % of ROIP[l] | 98 | — | 70 | — | 95 | — |
| IFT, (Dynes/cm) × $10^{-3}$ | 7.5 | 15 | 8.0 | 16 | 7.3 | 12 |

[a]Hoechst Dodiflood B-897 is a product of Hoechst identified as tributyl phenolether glycidyl sulfonate, sodium salt.
[b]$C_{13}H_{27}O(C_2H_4O)_6C_3H_6SO_3Na$.
[c]EDTA is sodium salt of ethylene diamine tetracetic acid.
[d]Shell Enordet APES 1215 is a product of Shell identified as sulfated $C_{12-15}$ propoxyl ethoxylate, sodium salt.
[e]Petrolig ERA-16 is a product of Reed Lignin, Inc. identified as lignosulfonate.
[f]$C_{16}H_{33}O(C_3H_6O)_4(C_2H_4O)_2C_3H_6SO_3Na$
[g]$C_6H_{13}CHCH_2O(C_3H_6O)_x(C_2H_4O)_3C_3H_6SO_3Na\ C_8H_{17}$
[h]$RO(C_3H_6O)_mC_3H_6SO_3Na$, wherein R = $C_{12-15}$ and m = 3.9.
[i]Shell Enordet IOS-1720 is a product of Shell identified as sulfonated $C_{17-20}$ internal olefin, sodium salt.
[j]Flocon 4800 M is a product of Pfizer identified as xanthan gum.
[k]Actigum CS-11 is a product of Jetco Chemicals identified as scleroglucan gum.
[l]Percent by weight of residual oil in place.

Examples 1–6 indicate that significant levels of oil recovery can be achieved using the inventive method and in doing so employing relatively low concentrations of surfactant in the waterflood. A comparison of Examples 1–6 with Examples 1A–6A indicates significant reductions of IFT values are achieved when the polymeric thickeners are used in combination with the surfactants, in accordance with the inventive method when compared to the values achieved when the polymeric thickeners were not used.

EXAMPLE 7

IFT values were measured at 80° C. for varying concentrations of surfactant both with and without a polymeric thickener in seawater using the above-described procedure. The surfactant that was used consisted a mixture of Shell Enordet APES 1215 and Shell Enordet IOS 1720. The weight ratio of these two surfactants was 1:1. The combined concentration of this mixture of surfactants ranged from 0.025% to 1.0% by weight as indicated in Table II. The polymeric thickener that was used was Actigum CS-11. The concentration of this thickener for each run, when used, was 0.15% by weight. The IFT values that were found are indicated in Table II:

TABLE II

| | Surfactant Concentration | IFT (dynes/cm) × $10^{-3}$ | |
|---|---|---|---|
| Run No. | (Wt. %) | Without Polymer | With Polymer |
| 1 | 0.025 | >1000 | 440 |
| 2 | 0.05 | 900 | 3.5 |
| 3 | 0.1 | 64 | 2.3 |
| 4 | 0.35 | 7.8 | 1.3 |
| 5 | 0.6 | 4.5 | 2.1 |
| 6 | 1.0 | 5.6 | 3.3 |

These tests indicate that significant improvements in interfacial tension are achieved when a polymeric thickener is employed in combination with a suitable surfactant in accordance with the invention. These tests also demonstrate that significantly low IFT values are obtained when relatively low concentrations of surfactant are employed with a polymeric thickener and that the IFT values unexpectedly increase when the surfactant concentration exceeds certain preferred levels.

An advantage of this invention is that effective levels of oil recovery can be achieved with relatively lower levels of surfactant utilization than suggested in the prior art. Thus, the present invention provides significant economic advantages over such prior art methods due to the fact that surfactants are typically costly materials. While not wishing to be bound by theory, it is believed that the achievement of such effective levels of oil recovery with such low levels of surfactant utilization is due to a synergistic interaction between the surfactant (A) and the polymeric thickener (B).

EXAMPLE 8

Oil displacement tests were conducted using the procedure described above. The temperature was 93.3° C. The oil was stock tank oil. Berea sandstone cores were used. These sandstone cores had dimensions of 1.5"×12", average porosities of 23.6% and average permeabilities of 421 md. The residual oil level in each core was 41%. Sea water having the above-indicated characteristics was used in the waterflood. Between 2 and 3 pore volumes of waterflood was used for each test. The polymeric thickener was Actigum CS-11. Two surfactants were used. Surfactant No. 1 is represented by the formula

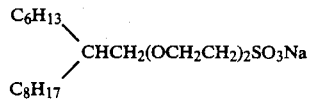

Surfactant No. 2 is represented by the formula

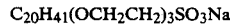

The results of these tests are indicated in Table II. In Table III, all numerical values are in percent by weight unless otherwise indicated.

TABLE III

| | 8A | 8B | 8C |
|---|---|---|---|
| Surfactant No. 1 | 1.0 | 1.0 | — |
| Surfactant No. 2 | 0.08 | 0.08 | — |
| Actigum CS-11 | 0.15 | — | 0.15 |
| Oil Displacement, % by Vol. of ROIP | 68 | 21 | 2.3 |

Example 8A is illustrative of the inventive method, while Examples 8B and 8C are provided for purposes of comparison. This example illustrates the synergistic effect on oil displacement achieved by the combination of surfactants and polymeric thickeners employed in accordance with the inventive method.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A method for recovering oil from a subterranean formation comprising injecting an aqueous composition into said formation and displacing said oil toward one or more production wells, said aqueous composition comprising:

(A) from about 0.1% to about 1.2% by weight of at least one compound represented by the formula

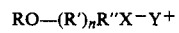

wherein: R is a hydrocarbyl group of from about 8 to about 24 carbon atoms: R' is ethoxy, propoxy or a mixture thereof; R" is a divalent hydrocarbyl group of 1 to about 20 carbon atoms; X is a sulfate, sulfonate or carboxylate group; Y is a cation; and n is a number in the range of 1 to about 20;

(B) from about 0.02% to about 0.3% by weight of at least one polymeric thickener; and at least one co-surfactant represented by the formula $$R^6-A^-M^+$$

wherein $R^6$ is a hydrocarbyl group of about 10 to about 28 carbon atoms, A is a sulfate, sulfonate or carboxylate group, and M is a cation, the concentration of said co-surfactant having an upper limit of about 0.5% by weight.

2. The method of claim 1 wherein the concentration of (A) in said aqueous composition is from about 0.1% to about 1% by weight.

3. The method of claim 1 wherein the concentration of (A) in said aqueous composition is from about 0.1% to about 0.7% by weight.

4. The method of claim 1 wherein the concentration of (A) in said aqueous composition is from about 0.15% to about 0.5% by weight.

5. The method of claim 1 wherein the concentration of component (B) in said aqueous composition is from about 0.05% to about 0.15% by weight.

6. The method of claim 1 wherein R is a hydrocarbyl group of about 8 to about 20 carbon atoms.

7. The method of claim 1 wherein R is a hydrocarbyl group of about 12 to about 18 carbon atoms.

8. The method of claim 1 wherein R is an alkyl or an alkenyl group.

9. The method of claim 1 wherein R" is a divalent hydrocarbyl group of 1 to about 10 carbon atoms.

10. The method of claim 1 wherein component (B) is a polysaccharide.

11. The method of claim 1 wherein component (B) is a partially hydrolyzed polyacrylamide.

12. The method of claim 1 wherein component (B) is a xanthan gum.

13. The method of claim 1 wherein component (B) is a homopolysaccharide.

14. The method of claim 1 wherein component (B) is represented by the formula

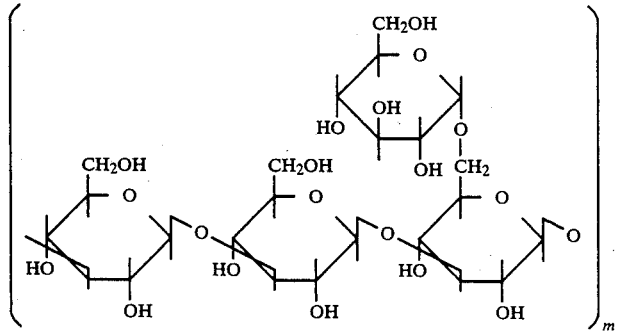

wherein m is an integer that is sufficiently high enough to provide a molecular weight of above about one million.

15. The method of claim 1 wherein said aqueous composition comprises a surfactant slug, said method further comprising the steps of injecting into said formation a buffer slug to follow said surfactant slug, said buffer slug comprising an aqueous solution containing an effective amount of at least one thickener to provide said buffer slug with a viscosity of about equal to or exceeding the viscosity of said surfactant slug, then p1 injecting into said formation an aqueous flooding medium.

16. The method of claim 1 wherein said aqueous composition comprises a surfactant slug, said method further comprising the step of injecting into said formation an aqueous flooding medium.

17. The method of claim 1 wherein the water employed in said aqueous composition is sea water.

* * * * *